United States Patent
Schoppmeier

(10) Patent No.: US 8,750,330 B2
(45) Date of Patent: Jun. 10, 2014

(54) METHODS AND APPARATUSES FOR DATA COMPRESSION

(75) Inventor: Dietmar Schoppmeier, Neubiberg (DE)

(73) Assignee: Lantiq Deutschland GmbH, Neubiberg (DE)

( * ) Notice: Subject to any disclaimer, the term of this patent is extended or adjusted under 35 U.S.C. 154(b) by 177 days.

(21) Appl. No.: 13/358,103

(22) Filed: Jan. 25, 2012

(65) Prior Publication Data

US 2012/0120956 A1    May 17, 2012

Related U.S. Application Data

(62) Division of application No. 11/653,112, filed on Jan. 12, 2007, now abandoned.

(51) Int. Cl.
| | | |
|---|---|---|
| H04L 12/28 | (2006.01) | |
| H04J 3/16 | (2006.01) | |
| H04J 3/24 | (2006.01) | |
| H04J 3/18 | (2006.01) | |

(52) U.S. Cl.
USPC ........ 370/473; 370/392; 370/395.1; 370/471; 370/474; 370/477

(58) Field of Classification Search
USPC .............. 370/392, 395.1, 471, 473, 474, 476, 370/477; 709/232
See application file for complete search history.

(56) References Cited

U.S. PATENT DOCUMENTS

| | | | |
|---|---|---|---|
| 5,579,316 A | 11/1996 | Venters et al. | |
| 5,642,421 A | 6/1997 | Gray et al. | |
| 5,835,730 A | 11/1998 | Grossman et al. | |
| 6,111,871 A | 8/2000 | Chen et al. | |
| 6,272,128 B1 * | 8/2001 | Pierson, Jr. | 370/352 |
| 6,289,020 B1 | 9/2001 | Sakaguchi | |
| 6,560,206 B1 * | 5/2003 | Naden et al. | 370/310.1 |
| 6,760,345 B1 | 7/2004 | Rosengard | |
| 6,963,570 B1 * | 11/2005 | Agarwal | 370/395.32 |
| 6,970,476 B1 | 11/2005 | Jonsson et al. | |
| 7,006,500 B1 * | 2/2006 | Pedersen et al. | 370/394 |
| 7,154,895 B1 | 12/2006 | Bornemisza et al. | |
| 7,366,121 B1 | 4/2008 | Mitchell et al. | |
| 7,395,355 B2 | 7/2008 | Afergan et al. | |
| 7,539,130 B2 | 5/2009 | Le et al. | |
| 2002/0131425 A1 * | 9/2002 | Shalom | 370/401 |
| 2002/0191614 A1 | 12/2002 | Ido et al. | |
| 2004/0062198 A1 * | 4/2004 | Pedersen et al. | 370/229 |
| 2005/0002265 A1 | 1/2005 | Cassiers et al. | |

OTHER PUBLICATIONS

Non-Final Office Action dated Dec. 10, 2009 for U.S. Appl. No. 11/653,112. 35 Pages.
Final Office Action dated Jun. 9, 2010 for U.S. Appl. No. 11/653,112. 34 Pages.
Non-Final Office Action dated Apr. 1, 2011 for U.S. Appl. No. 11/653,112. 34 Pages.
Final Office Action dated Oct. 25, 2011 for U.S. Appl. No. 11/653,112. 34 Pages.

* cited by examiner

*Primary Examiner* — Redentor Pasia
(74) *Attorney, Agent, or Firm* — Eschweiler & Associates, LLC

(57) ABSTRACT

A plurality of cells are combined into a macro cell. In a macro header of the macro cell a full numbering information of a first cell of the plurality of cells is stored. For further cells of the plurality of cells other than the first cell, a deviation information indicating a deviation of a numbering information of the respective further cell from the full numbering information of the first cell or one of the further cells is stored. In some embodiments, additionally the headers of the individual cells are incorporated in the macro header.

26 Claims, 3 Drawing Sheets

FIG 1

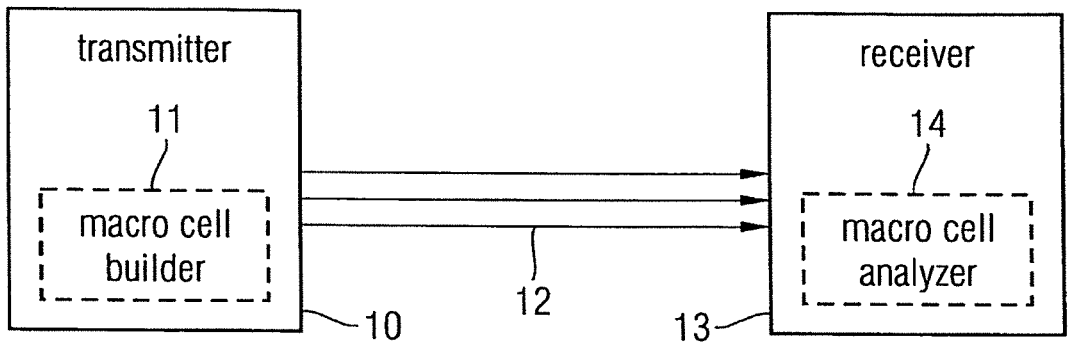

FIG 2

MacroHeaderByte0[4:0] = lookup table index of 1st cell
MacroHeaderByte0[7:5] = Macrocell-CRC-6[5:3]
MacroHeaderByte1[4:0] = lookup table index of 2nd cell
MacroHeaderByte1[7:5] = Macrocell-CRC-6[2:0]
MacroHeaderByte2[7:0] = SID[11:4]of 1st cell = 01000000
MacroHeaderByte3[7:4] = SID[3:0]of 1st cell = 0001
MacroHeaderByte3[3:0] = deltaSID[3:0]of 2nd cell = 0010

FIG 3

MacroHeaderByte0[4:0] = lookup table index of 1st cell
MacroHeaderByte0[7:5] = Macrocell-CRC-8[7:5]
MacroHeaderByte1[4:0] = lookup table index of 2nd cell
MacroHeaderByte1[7:5] = Macrocell-CRC-8[4:2]
MacroHeaderByte2[4:0] = lookup table index of 3rd cell
MacroHeaderByte2[5] = reserved
MacroHeaderByte2[7:6] = Macrocell-CRC-8[1:0]
MacroHeaderByte3[7:0] = SID[7:0]of 1st cell = 01001111
MacroHeaderByte4[7:4] = deltaSID[3:0]of 2nd cell = 0010
MacroHeaderByte4[3:0] = deltaSID[3:0]of 3rd cell = 0010

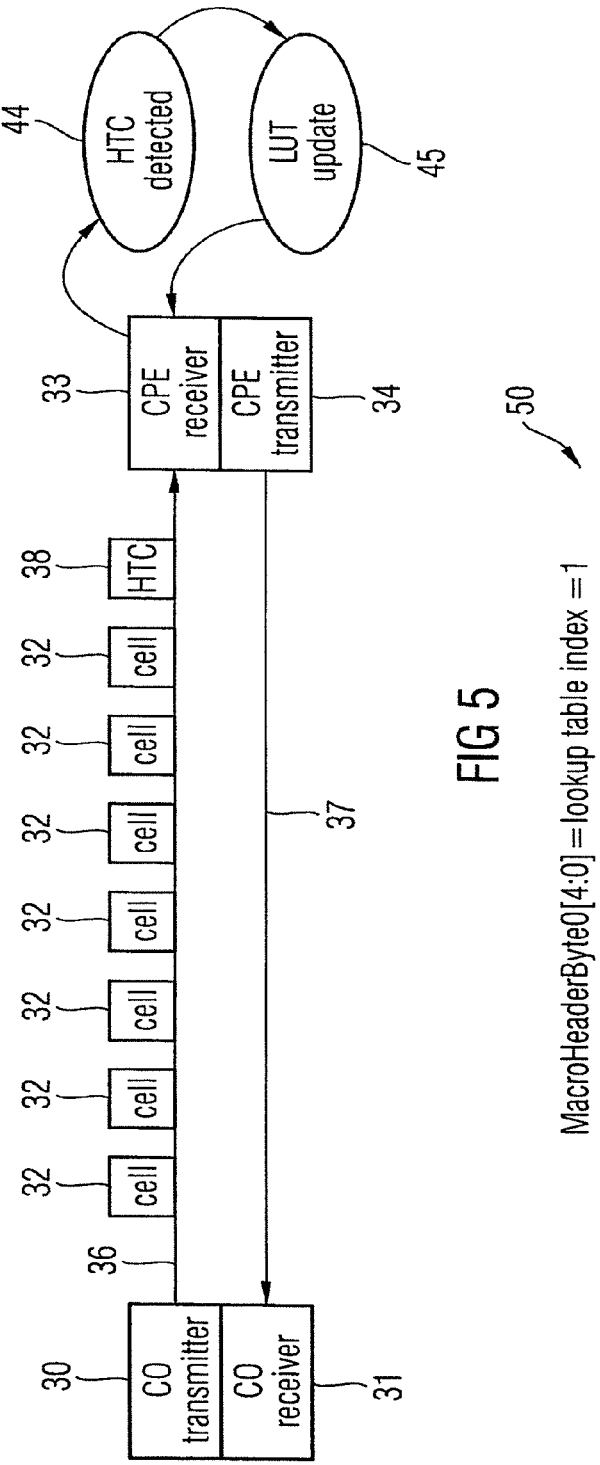

METHODS AND APPARATUSES FOR DATA COMPRESSION

REFERENCE TO RELATED APPLICATION

This application is a divisional of U.S. patent application Ser. No. 11/653,112 filed on Jan. 12, 2007.

BACKGROUND OF THE INVENTION

The present invention relates to methods and apparatuses for data compression.

A header is a part of the transmitted data which contains information used for handling the data transmission, in contrast to the payload which represents the actual data to be transmitted.

Headers are for example used in cell-based or packet based data transmission, wherein each data cell or each data packet has its own header. General examples for such headers are headers of IP packets or header of ATM cells (Asynchronous Transfer Mode). It should be noted that in general no clear delimitation between the terms "packet" and "cell" exists, since both terms relate to entities having a header and payload data. However, usually the term packet is used in a different layer in a layered communication model, e.g. the OSI model (Open Systems Interconnection) than the term cell. In the following, only the term cell will be used to generally designate a portion of data to be sent together with its header and is intended to also cover data packets fulfilling this requirement. An example for such cells used in the embodiments which will be described in the following are ATM cells, ATM being a conventional mode for transmitting data, for example for transmitting data from a central office to customer's premises, for example a home or an office, for DSL (Digital Subscriber Line) communication.

In order to keep the overhead generated by the headers of the cells, i.e. the additional header data to be transmitted, as small as possible, header compression algorithms are used. For example, for ATM header compression in the transmission convergence layer (ATM-TC header compression), a 5-byte ATM header may be compressed to a 1-byte header using a lookup table.

In some cases, headers of cells comprise a numbering information designating a consecutive numbering of the cells. An example for this in case of ATM transmission is IMA+ bonding according to the ITU (International Telecommunication Union) recommendation ITU-T G.998.1. IMA (Inverse Multiplexing over ATM) bonding is a technique wherein the ATM cells are transmitted over a plurality of parallel links, for example separate wires, in order to increase the bandwidth. In case of said IMA+ bonding, a bonding layer specific sequence index (SID) is included in the headers of the ATM cells in the form of an 8-bit or 12-bit field incremented by one for each following ATM cell which will be passed from a bonding entity or layer to an ATM-TC entity or layer. This SID is an example for the numbering information mentioned above and may, in case of IMA+ bonding, be used to reconstruct the correct order of the cells received over the plurality of parallel links mentioned above.

SUMMARY

A first embodiment of the invention includes a plurality, i.e. at least two, cells are combined into a macro cell. In a macro header of said macro cell a full numbering information of a first cell of said plurality of cells is stored. For further cells of said plurality of cells other than said first cell, a deviation information indicating a deviation of a numbering information of the respective further cell from said full numbering information of said first cell or one of said further cells is stored. In some embodiments, additionally the headers of the individual cells are incorporated in the macro header.

BRIEF DESCRIPTION OF THE DRAWINGS

Embodiments of the present invention will be discussed in the detailed description which follows with reference to the attached drawings which are intended to be illustrative only and not to be construed as limitative and wherein:

FIG. 1 shows a data transmission system comprising a transmitter and a receiver according to an embodiment, FIG. 2 shows an embodiment of a structure of a macro header, FIG. 3 shows a further embodiment of a structure of a macro header, FIGS. 4A-4C show transmitters and receivers according to further embodiments of the present invention and furthermore show steps of a method according to an embodiment, and FIG. 5 shows an embodiment of the structure of a request HTC.

DETAILED DESCRIPTION

Figure 4A:
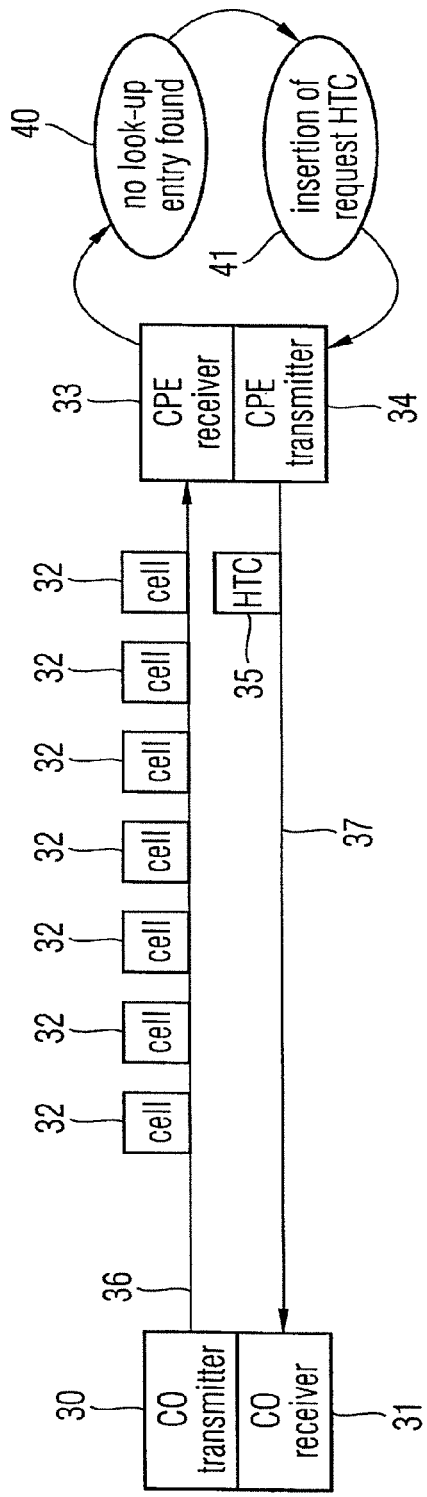

In the following, embodiments of the invention will be discussed with reference to the attached drawings. Before the actual description of the embodiments, some terms used in the description will be explained and defined in order to facilitate understanding of the description.

The embodiments discussed in the following generally relate to data compression, for example header compression within the context of data transmission. A header, as discussed above, is a part of the transmitted data which contains information used for handling the data transmission, in contrast to the payload which represents the actual data to be transmitted.

It will be appreciated that while embodiments of the invention are suitable for use with ATM cells or SIDs as numbering information as discussed further above, embodiments may also be applied in other situations, for example to other numbering information comprised in headers as well.

According to an embodiment, a plurality, i.e. at least two, cells are combined into a macro cell. In a macro header of said macro cell a full numbering information of a first cell of said plurality of cells is stored. For further cells of said plurality of cells other than said first cell, a deviation information indicating a deviation of a numbering information of the respective further cell from said full numbering information of said first cell or one of said further cells is stored. In embodiment, additionally the headers of the individual cells are incorporated in the macro header.

In an embodiment, this deviation information represents the difference of the numbering information between the respective further cell and a cell preceding the respective cell.

Since in such embodiments only for the first cell the full or complete numbering information has to be stored and for the remaining cells a deviation information is stored, less information has to be transmitted and therefore an effective compression for the numbering information is obtained. Furthermore, since numbering information for all the cells combined into the macro cell is transmitted and reconstructable from the numbering information of the first cells and the above-mentioned deviation information, an easy implementation without the need to change the assignment of numbering information to the cells and the use of said numbering information is possible. Furthermore, according to such embodiments, cells may be grouped into macro cells as desired since for each cell the numbering information is preserved.

FIG. 1 in this respect shows a block diagram of a communication system comprising a transmitter 10 according to an embodiment and a receiver 13 according to an embodiment, wherein data is sent from transmitter 10 to receiver 13 via one or more communication channels 12. In case more than one communication channel 12 is provided, in an embodiment of the invention the above-mentioned bonding is used in order to use more than one channel for data transmission and therefore to increase the bandwidth of the transmission.

Transmitter 10 of the embodiment of FIG. 1 may for example be realized in the form of one or more integrated circuits incorporated in one or more chips. The conventional elements of transmitter 10 like line drivers, encoders, and the like are, for clarity's sake, not shown in FIG. 1.

Transmitter 10 comprises a macro cell builder 11 which, similar to the embodiment described above, combines a plurality of cells to be transmitted into a macro cell, wherein a macro header of such a macro cell comprises the numbering information and deviation information. Macro cell builder 11 in an embodiment is implemented in the firmware of transmitter 10.

Receiver 13 according to the embodiment of FIG. 1, of which conventional elements again are not shown, comprises a macro cell analyzer 14 corresponding to macro cell builder 11 of transmitter 10. In particular, macro cell analyzer 14 if needed reconstructs the individual cells from the macro cell and assigns the numbering information to the individual cells by combining the numbering information of the first cell of the macro cell with the corresponding deviation information. Otherwise, the structure of receiver 13 may be based on the structure of any conventional receiver.

It should be noted that in the transmission system of FIG. 1 according to other embodiments on both sides a transmitter and a receiver may be present, similar to embodiments which will be discussed later with reference to FIGS. 4A-4C.

Embodiments of headers of macro cells, i.e. macro headers, will now be discussed with reference to FIGS. 2 and 3. The embodiments of FIGS. 2 and 3 are based on ATM cells combined into a macro cell having a macro header. The numbering information in this case is the above-mentioned SID.

FIG. 2 shows an embodiment of a macro header 20 of a macro cell which comprises 4 bytes, in the embodiment shown designated MacroHeaderByte0, MacroHeaderByte1, MacroHeaderByte2 and MacroHeaderByte3. In brackets the bits of the respective macro header byte are given which carry the information indicated on the right side in FIG. 2. The bits are numbered from 0-7, such that for example MacroHeaderByte0[4:0] designates bits 0, 1, 2, 3 and 4 of MacroHeaderByte0.

In the embodiment of FIG. 2, an exemplary macro header for a macro cell comprising two cells, wherein 12-bit SIDs are assigned to the cells, is given. The deviation information, in this case designating the difference between SIDs of successive cells, is designated deltaSID in FIG. 2 and is represented as a 4-bit value. The embodiment shown may be for example used for transmitting cells wherein three links having the same speed are used for the above-mentioned bonding and the cells are distributed on the links using a round-robin algorithm.

In bits 0-4 of byte 0 of macro header 20 of FIG. 2 the compressed ATM header of the first cell is stored in form of a lookup table index. In other words, the header of the first cell is compressed using a lookup table, and the lookup table index stored in bits 0-4 of Byte0 is used to reconstruct or decompress the header of the first cell using the lookup table by retrieving the value(s) indicated by the lookup table index from the lookup table. The handling of such lookup tables will be discussed in greater detail later.

In a similar manner, in bits 0-4 of byte 1 of macro header 20 of FIG. 2 the lookup table index, i.e. the compressed header, of the second cell is stored.

In bits 5-7 of byte 0 and byte 1 of macro header 20 a 6-bit checksum labeled Macrocell-CRC-6 is stored, wherein bits 3-5 of the checksum are stored in bits 5-7 of byte 0 and bits 0-2 of the checksum are stored in bits 5-7 of byte 1 of the header 20 of FIG. 2. CRC in this is an abbreviation for cyclic redundancy check. Such checksums are conventionally used for assuring the integrity of the macro header, e.g. to check at the receiver whether the macro header has been received in a correct manner.

In bits 0-7 of byte 2 of macro header 20 bits 4-11 of the SID of the first cell are stored, whereas bits 0-3 of the SID of the first cells are stored in bits 4-7 of byte 3. As an example, as SID of the first cell of 010000000001 is given. In bits 0-3 of byte 3 of header 20, the deltaSID of the second cell is given, which in the example shown has a value of 0010.

In the embodiment shown, the deviation information, i.e. the deltaSID(x) for cell number x is calculated according to $$\text{deltaSID}(x) = \text{SID}(x) - \text{SID}(x-1) - 1 \quad (1)$$

wherein SID(x) designates the SID of cell number x and SID(x−1) designates the SID of the cell preceding cell number x.

In the numerical example given in FIG. 2 and discussed above, the SID of cell number 2 can be reconstructed from the information stored in macro header 20 by adding the deltaSID of the second cell to the SID of the first cell and adding 1 according to equation (1) given above. Therefore, in the numerical example given, the SID of the second cell would be 010000000100.

In FIG. 3 a further embodiment of a macro header of a macro cell is shown as macro header 21. In case of macro header 21, an 8-bit SID is used for each cell with deltaSIDs of four bits. Furthermore, in case of macro header 21, three cells are combined to a macro cell. Like macro header 20 of FIG. 2, also macro header 21 may for example be used when three links having the same speed are bonded for transmission and the cells are distributed using round-robin.

Macro header 21 comprises five bytes named MacroHeaderByte0 to MacroHeaderByte4. Bits 0-4 of bytes 0, 1 and 2 are used for storing the lookup table index, i.e. the compressed header of the first cell, second cell and third cell combined into the macro cell, respectively.

While in macro header 20 of FIG. 2 a 6-bit checksum is used, in macro header 21 an 8-bit checksum labeled MacrocellCRC-8 is used. In general, by using more bits for the checksum, a higher accuracy in detecting corrupt cells is achieved, but more data has to be transmitted. Bits 5-7 of this checksum are stored in bits 5-7 of byte 0, bits 2-4 are stored in bits 7-5 of byte 1 and bits 0 and 1 are stored in bits 6 and 7 of byte 2 of header 21. Bit 5 of byte 2 of header 21 is, in the embodiment of FIG. 3, not used and reserved for future purposes.

In bits 0-7 of byte 3, i.e. in the whole byte 3, the SID of the first cell is stored, which as an example may be 0100111. In bits 4-7 of byte 4 the deltaSID, i.e. the deviation information of the second cell is stored, and in bits 0-3 of Byte4 the deltaSID of the third cell is stored. In the numerical example given, both the deltaSID of the second cell and the deltaSID of the third cell have a value 0010.

The deltaSID values are calculated in the same manner as in the embodiment of FIG. 2.

It should be noted that macro headers 20 and 21 are only examples for possible headers. In particular, the bitwidth of SID and deltaSID may be varied according to the application. Furthermore, the number of cells combined to a macro cell is not limited, and more than two or three cells as in the embodiments shown are possible.

Furthermore, the way this information stored in the header is distributed on the bytes of the header may be varied as desired. For example, for macro header 20 in a different embodiment the SID and deltaSID may be stored in bytes 0 and 1, and the lookup table indices and the checksum may be stored in bytes 2 and 3. Furthermore, while in the macro headers 20 and 21 according to the embodiments shown the lookup table indices each comprise five bits and the checksum comprises six bits or eight bits, other values are equally possible.

It should be noted that the concept of the present invention may also be applied in cases where the headers of the cells are not compressed, i.e. no lookup table is used, or in cases a different compression method is used. In this case, for example, only numbering information and the deviation information, for example SID and deltaSID in an embodiment are stored in the macro header of the macro cell. As a matter of course, the numerical example given for SID and deltaSID are just examples to provide a better understanding of the underlying concept are not to be construed as limitative, since other values may be used as well. Also, the equation given above for the calculation of the deltaSID may be varied, for example by omitting the term "−1" on the right side of equation (1).

In further embodiments based on the embodiments discussed above, in case a control cell is transmitted a numbering information of this control cell is assigned depending on numbering information of a previous cell or following cell. For idle cells, the same principle as for control cells may be employed. This concept will be illustrated in the following with reference to ATM-based transmission as in the embodiments of FIGS. 2 and 3.

In ATM-based transmission, such control cells are for example ASM cells (Autonomous Status Messages). Furthermore, in ATM transmission sometimes idle cells, i.e. cells transmitting no payload data, are inserted when no actual data is to be transmitted. Such ASM cells or idle cells are conventionally assigned an SID of 0. Such an SID of 0 is also called a pseudo-SID since it does not have any real significance since such control cells or idle cells do not have to be brought into any order.

When such cells with an SID of 0 is incorporated into a macro cell as for example in the embodiments of FIGS. 2 and 3, the deltaSID of the ASM cell or idle cell and/or the delta-SID of a cell following or preceding the ASM cell or idle cell could become very large (see e.g. equation (1)) and would need a corresponding large number of bits for representation. Therefore, in an embodiment, this SID of 0 is replaced by a different SID.

In the following, three possibilities for replacing an SID of 0 in such a cell according to different embodiments are given. In other embodiments, these possibilities may be used selectively or in combination depending on the circumstances, or different SIDS may be used. It should be noted that the same principle can be used if a value other than 0 is assigned to such cells, i.e. a different pseudo-SID is used.

As a first possibility, in an embodiment a pseudo-SID is replaced by the last non-pseudo-SID on bonding level before the deltaSID values are determined. The last non-pseudo-SID on bonding level in this respect is the last non-zero pseudo-SID of all cells sent over the plurality of links used for transmission in case of bonding. If no last non-pseudo-SID exists, no replacement is done.

As a second possibility, a pseudo-SID is replaced by the last non-pseudo-SID on link level. The last pseudo-SID on link level in this case is the last non-pseudo-SID of a cell sent over the same link as the control or idle cell having the pseudo-SID. Again, if no such last non-pseudo-SID exists no replacement is done according to this embodiment.

As a third possibility used in an embodiment, a pseudo-SID will be replaced by the next non-pseudo-SID in the macro cell where the cell with the pseudo-SID is incorporated. If no next non-pseudo-SID exits, no replacement is done.

As a matter of course, other possibilities may be used in other embodiments.

In the embodiments mentioned above, the receiver according to an embodiment ignores SID values of control cells like ASM cells or idle cells. Such cells may for example be identified based on their VPI (Virtual Path Identifier) or VCI (Virtual Channel Identifier) values.

In the following, some numerical examples for the above possibilities will be given.

Assuming for example that a macro cell comprises three cells, the first cell having an SID of 76 and the second and third cells being control or idle cells having a pseudo-SID, for example 0, the second and third cell according to an embodiment are set to 76 as well, such that their deltaSIDs indicates a deviation of 0 and thus may easily be represented by the 4-bit values mentioned above. Without the replacement, the deltaSID would have to indicate a deviation of 76.

Correspondingly, at a receiver the SIDs of the second and third cell would be recovered as 76, but as these cells are control or idle cells, the values of the second and third cell would be ignored.

If, in a different example, the first and third cell of a macro cell would have pseudo-SIDs and the second cell would have an SID of 76 and furthermore, the last non-pseudo-SID before this macro cell would be 68, the SID of the first cell according to an embodiment using the first or second possibility mentioned above would be set to 68, while the SID of the third cell would be set to 76. Therefore, the deltaSID for the second cell would have to represent a deviation of 8, while the deltaSID for the third cell would have to represent a deviation of 0.

For the third possibility mentioned above, for example if the first and second cell of a macro cell would have a pseudo-SID and the third cell would have an SID of 76, all the SIDS would be set to 76.

As a matter of course, the above examples serve only for illustration, and other values and macro cells having less or more than three cells incorporated may equally be treated with the embodiments described above.

As mentioned above, in the embodiments of FIGS. 2 and 3 the headers of the individual ATM cells are compressed using a lookup table. It should be noted that such a compression using a lookup table can be used independently from the concept of macro cells introduced above and in particular may also be used to compress headers of single cells which are not combined into macro cells. The lookup table in each case serves as a kind of dictionary for translating the lookup table index mentioned above into the uncompressed header and vice versa. In order to achieve this, the lookup table has to be present both in the transmitter which compresses the header into the lookup table index and the receiver which decompresses the lookup table index into the header. In this respect it should be noted that the lookup table need not stay constant but may be adapted depending on the headers of the cells actually sent in order to ensure that the headers used are reflected in the lookup table. Therefore, in embodiments, the lookup table is sent from transmitter to receiver in periodic intervals, for example every second. For header compression of ATM cells, a so-called header translation cell (HTC) which comprises the complete lookup table or a part of the lookup table to be updated is used.

In such a system, the situation may occur where a cell with a lookup table index, i.e. a compressed header, is received for which no match is found in the lookup table. In conventional systems, in this case the cell is discarded. This may in particular happen when a lookup table update is sent immediately preceding a cell and this update is "corrupt", for example due to transmission errors. Such transmission may be detected by controlling the checksum of the cell transmitting the lookup table, for example the above-mentioned header translation cell. On the other hand, it is also possible that during transmission of the header translation cells a plurality of bit errors occur compensating each other such that the checksum is still correct but the lookup table is wrong. Also in this case, it may happen that the lookup table index of a received cell cannot be found. In case this happens only for single cells, a possible remedy is to send the cell again. However, in case of a plurality of cells which cannot be used become their lookup table index cannot be found in the lookup table this may lead to serious delays in transmitting.

According to an embodiment of the invention, if a received compressed data cannot be decompressed using decompression information, a request is sent to a transmitter for an update of the decompression information. In a corresponding embodiment of a transmitter, when such a request is received the decompression information is sent. In embodiments of the invention, the decompression information is a lookup table and decompressed data is a lookup table index. In a particular embodiment, the compressed data is a header. However, in other embodiments other decompression information apart from a lookup table may be used to compress data other than a header.

The above requesting and sending of the decompression information in embodiments of the invention is used in addition to a periodic transmission of the decompression information like the periodic sending of the lookup table or parts thereof mentioned above.

An embodiment implementing the concept described above will be discussed next with reference to FIGS. 4A-4C which show a transmission system in three different stages of a method according to an embodiment of the present invention. The transmission system shown in FIGS. 4A-4C is a transmission system between a central office (CO) and customer's premises (CPE). In the central office, a CO transmitter 30 and a CO receiver 31 are located, while in the customer's premises a CPE receiver 33 and a CPE transmitter 34 are located. CO transmitter 30 sends data in the form of cells 32 to CPE receiver 33 over a channel 36, and CPE transmitter 34 sends data via a channel 37 to CO receiver 31. It should be noted that channel 36 and channel 37 may physically be implemented on the same line, for example a copper line pair, and on the other hand in each case a plurality of links for example using the above-described bonding may be used in embodiments of the invention.

Cells 32 in the embodiment shown are macro cells as discussed above. However, in other embodiments simple ATM cells or other forms of cells or data packets may be transmitted.

In FIG. 4A, CPE receiver 33 receives a cell 32 for which, as indicated in step 40 of a method according to an embodiment, no lookup entry, i.e. no entry corresponding to a lookup table index of the cells is found in a lookup table stored in CPE receiver 33. Therefore, CPE transmitter 34 inserts, into the sequence of cells it normally would transmit to CO receiver 31, a request HTC 35 which is a special cell requesting an updated lookup table. This is indicated in step 41.

Figure 4B:
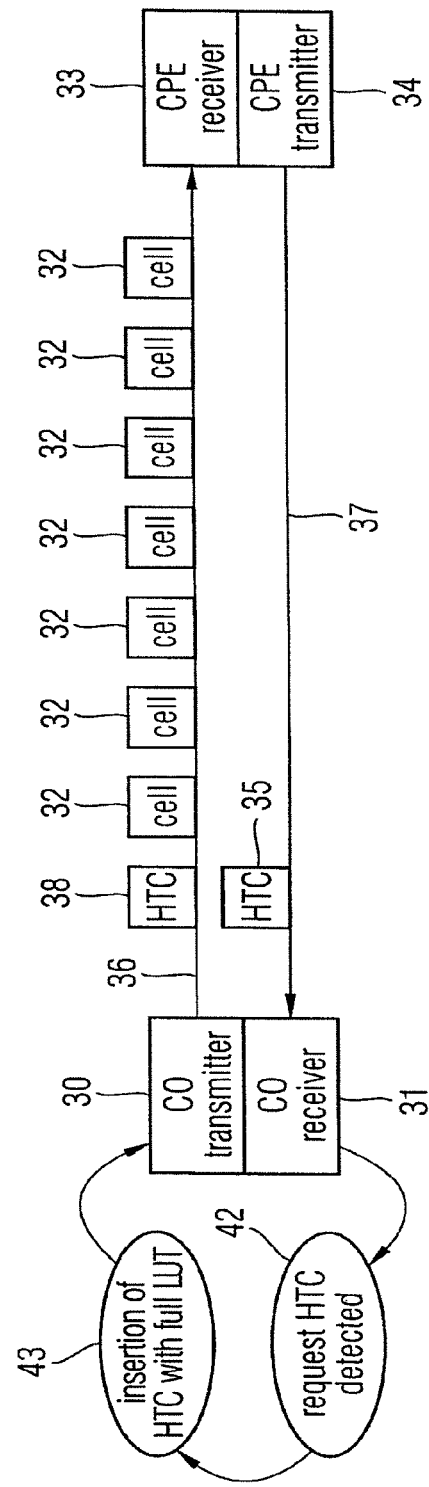

In FIG. 4B, HTC 35 is received at CO receiver 31 and identified as a request HTC as indicated in step 42. In response to this detection, in step 43 CO transmitter 30 inserts an HTC 38 comprising a full lookup table, i.e. the complete lookup information available to CO transmitter 30, into the sequence of cells transmitted to CPE receiver 33.

In FIG. 4C, HTC 38 comprising the lookup table is received at CPE receiver 33 and identified as an HTC in step 44. In response to this, CPE receiver 33 as indicated in step 45 performs a lookup table update by replacing the previously stored lookup table with the lookup table transmitted by HTC 38.

Therefore, from this time onwards, an updated and accurate lookup table is present in receiver 33, and the number of cells received between step 40 and step 45 is reduced compared to the case where a lookup table or part thereof is only transmitted in predetermined regular intervals of for example one second, in which case a significant number of cells could be sent before receiving the accurate lookup table. The cells received in the meantime at CPE receiver 33, i.e. between step 40 and 45, may be either discarded and possible resent or be stored in a memory of CPE receiver 35 and be decompressed and processed as soon as the lookup table is updated. In other embodiments, only those cells are discarded or stored for which a decompression before step 45 is not possible, i.e. only those cells for which no lookup entry is found.

HTC cells like HTC 35 or 38 are cells which in their header are marked as being HTC cells. In case macro cells with headers like the one previously discussed with reference to FIGS. 2 and 3 are used, FIG. 5 shows an embodiment of a cell 50 usable as HTC 35. The header of the cell 50 shown in FIG. 5 comprises two bytes named MacroHeaderByte0 and MacroHeaderByte1. In addition, in FIG. 5 the payload is shown comprising 96 bytes designated MacroPayloadByte0 to MacroPayloadByte95. In case of normal cells or macro cells, in these payload bytes the actual data is transmitted.

In case of cell 50 of FIG. 5, bits 0-4 of byte 0 comprise a "lookup table index" of 1, i.e. 00001. With this index an indication is given to the receiver of the cell that the cell is an HTC cell. In this respect, a value of the lookup table index of 0 may be used for indicating an idle cell, i.e. a cell inserted into the sequence but which does not carry any usable data, and lookup table indices other than 0 and 1 are used for representing the compressed header of a cell combined into the macro cells like discussed with reference to FIGS. 2 and 3. Bits 0-4 of byte 1 are used for providing the HTC cell with a serial number which is incremented after each HTC cell. With such a serial number, for example the correct order of receipt of HTC cells may be supervised. Bits 5-7 of byte 0 and byte 1 of the header of cell 50 comprise a 6-bit checksum similar to the one of macro header 20 of FIG. 2.

In the embodiment shown, for a request HTC like HTC 35, i.e. an HTC requesting that a lookup table be sent, the payload bytes 0 to 91 are all set to 0 such that only bytes 92 to 95 representing a checksum CRC for the payload may assume non-zero values. In other embodiments, other predetermined patterns for the payload bytes may be used for indicating a request HTC. On the other hand, if the HTC comprises a lookup table like in case of HTC 38, the payload bytes would be used for storing this lookup table.

The format of byte 0 and 1 of the header of cell 50 corresponds to the format of byte 0 and 1 of macro header 20 of FIG. 2. It should be noted that in case boding like IMA+ bonding which requires the assignment of numbering information like a SID to cells, the concept for storing SIDs similar to FIGS. 2 and 3 may be used in embodiments. In other words, the concepts explained with reference to FIGS. 1-3 on the other hand and with reference to FIGS. 4A-4C and 5 on the other hand may be implemented either separately or combined.

As already mentioned, while embodiments relating to ATM cells have been discussed above, the present invention is applicable to other kind of cell-based or packet-based transmission as well. As a matter of course, the format of the HTCs shown in the embodiment of FIG. 5 is not to be construed as limitative, and any kind of cell or group of cells indicating that a lookup table should be sent (in case of a request HTC) or transporting the information contained in a lookup table (like HTC 38) may be used.

What is claimed is:

1. A method for header compression using a macro cell builder component in a transmitter, comprising:
    assigning information to be transmitted to a plurality of cells using the macro cell builder component,
    assigning a numbering information to each cell of said plurality of cells using the macro cell builder component, and
    storing said numbering information in a header to be transmitted with said plurality of cells using the macro cell builder component, wherein said storing step comprises:
        storing a full numbering information of a first one of said plurality of cells in said header, and
        storing a deviation of said numbering information of another one of said plurality of cells from said full numbering information in said header, wherein the deviation indicates an offset of said numbering information of the another cell from the first cell.

2. The method according to claim 1, further comprising:
    combining said plurality of cells to form a macro cell, wherein said header comprises a macro header of said macro cell.

3. The method according to claim 2, wherein said macro header of said macro cell further comprises compressed headers of said plurality of cells.

4. The method according to claim 1, wherein said numbering information is a sequence index for bonding of a plurality of links for transmitting said plurality of cells.

5. The method according to claim 1, wherein said plurality of cells are asynchronous transfer mode (ATM) cells.

6. The method according to claim 1, wherein said assigning numbering information step comprises:
    determining if a cell to which said numbering information is to be assigned is one of a control cell and an idle cell, and
    assigning said numbering information corresponding to said numbering information of one of a cell preceding said cell and a cell following said cell to said cell if said cell is one of a control cell and an idle cell.

7. The method according to claim 6, wherein said control cell is an autonomous status message.

8. The method according to claim 1, wherein said numbering information comprises a specific sequence index (SID), and wherein the deviation (deltaSID(x)) for a cell number x in said plurality of cells is given by:

deltaSID($x$)=SID($x$)−SID($x$−1)−1, or deltaSID($x$)=SID($x$)−SID($x$−1), wherein SID($x$) designates the SID of cell number x, and SID($x$−1) designates the SID of a cell preceding cell number x.

9. A method for header decompression using a macro cell analyzer component in a receiver, said method comprising:
    providing a plurality of cells having a single header to the macro cell analyzer component,
    retrieving a full numbering information of a first one of said plurality of cells from said header using the macro cell analyzer component,
    retrieving deviation information representing a deviation of a numbering information of at least another one of said cells from said full numbering information from said header using the macro cell analyzer component, wherein the deviation indicates an offset of said numbering information of the another cell from the first cell, and
    reconstructing said numbering information of said another one of said plurality of cells from said full numbering information and said deviation information using the macro cell analyzer component.

10. The method according to claim 9, wherein said plurality of cells are combined to form a macro cell, and wherein said single header is a macro header of said macro cell.

11. The method according to claim 10, wherein said macro header comprises compressed headers of said plurality of cells, said method further comprising: decompressing said compressed headers.

12. The method according to claim 9, wherein said numbering information is a sequence index for bonding of a plurality of links over which said plurality of cells are received.

13. The method according to claim 9, wherein said plurality of cells are asynchronous transfer mode (ATM) cells.

14. The method according to claim 9, wherein reconstructing said numbering information comprises adding said full numbering information of the first one of said plurality of cells to the deviation of said numbering information of the another of said cells.

15. An apparatus for header compression, comprising: a cell builder configured to assign information to be transmitted to a plurality of cells, and further configured to assign a numbering information to each cell of said plurality of cells, and to store said numbering information in a single header to be transmitted with said plurality of cells, wherein said numbering information comprises: a full numbering information of a first one of said plurality of cells in said single header, and a deviation of said numbering information of another one of said plurality of cells from said full numbering information in said at least one header, wherein the deviation indicates an offset of the numbering information of the another cell from the first cell.

16. The apparatus according to claim 15, wherein said plurality of cells are combined to form a macro cell, wherein said single header is a macro header of said macro cell.

17. The apparatus according to claim 16, wherein said macro header of said macro cell further comprises compressed headers of said plurality of cells.

18. The apparatus according to claim 15, wherein said numbering information is a sequence index for bonding of a plurality of links for transmitting said plurality of cells.

19. The apparatus according to claim 15, wherein said plurality of cells are asynchronous transfer mode (ATM) cells.

20. The apparatus according to claim 15, further comprising: a transmitter configured to transmit said plurality of cells from the cell builder.

21. An apparatus for header decompression, wherein a single header is associated with a plurality of cells, said apparatus comprising: a cell analyzer configured to retrieve a full numbering information of a first one of said plurality of cells from said single header, and further configured to retrieve deviation information representing a deviation of a numbering information of at least another one of said cells from said full numbering information from said first cell, and to reconstruct said numbering information of said another one of said plurality of cells from said full numbering information and said deviation information, wherein the deviation indicates an offset of said numbering information of the another cell from the first cell.

22. The apparatus according to claim 21, wherein said plurality of cells are combined to form a macro cell, and wherein said single header is a macro header of said macro cell.

23. The apparatus according to claim 21, wherein said macro header comprises compressed headers of said plurality of cells.

24. The apparatus according to claim 21, wherein said numbering information is a sequence index for bonding of a plurality of links over which said plurality of cells are received.

25. The apparatus according to claim 21, wherein said plurality of cells are asynchronous transfer mode (ATM) cells.

26. The apparatus according to claim 21, further comprising: a receiver configured to receive said plurality of cells and provide such received cells to the cell analyzer.

* * * * *